US012073797B1

(12) United States Patent
Liu et al.

(10) Patent No.: US 12,073,797 B1
(45) Date of Patent: Aug. 27, 2024

(54) DRIVING METHOD FOR DRIVING ORGANIC LIGHT EMITTING DIODE DISPLAY PANEL

(71) Applicant: NOVATEK Microelectronics Corp., Hsinchu (TW)

(72) Inventors: Ching-Hua Liu, Hsinchu (TW); Yen-Tao Liao, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/468,747

(22) Filed: Sep. 18, 2023

(51) Int. Cl.
*G09G 3/3291* (2016.01)
*G09G 3/20* (2006.01)

(52) U.S. Cl.
CPC ......... *G09G 3/3291* (2013.01); *G09G 3/2003* (2013.01); *G09G 2300/0452* (2013.01); *G09G 2310/08* (2013.01); *G09G 2320/045* (2013.01); *G09G 2360/16* (2013.01)

(58) Field of Classification Search
CPC ............... G09G 3/3291; G09G 3/2003; G09G 2300/0452; G09G 2310/08; G09G 2320/045; G09G 2360/16
See application file for complete search history.

(56) References Cited

U.S. PATENT DOCUMENTS

| | | | | |
|---|---|---|---|---|
| 8,558,765 B2 * | 10/2013 | Cok | G09G 3/3225 | 345/82 |
| 9,123,295 B2 * | 9/2015 | Jeong | G09G 3/3233 | |
| 10,419,708 B2 * | 9/2019 | Tsai | G09G 3/3426 | |
| 11,222,597 B2 * | 1/2022 | Bong | G09G 3/2092 | |
| 2008/0055209 A1 * | 3/2008 | Cok | G09G 3/3225 | 345/77 |
| 2014/0152704 A1 * | 6/2014 | Jeong | G09G 3/3233 | 345/76 |
| 2016/0309112 A1 * | 10/2016 | Tsai | H04N 5/57 | |
| 2021/0201815 A1 * | 7/2021 | Bong | G09G 3/3266 | |
| 2023/0335071 A1 * | 10/2023 | Kim | G09G 5/10 | |

* cited by examiner

*Primary Examiner* — Michael Pervan
(74) *Attorney, Agent, or Firm* — CKC & Partners Co., LLC

(57) ABSTRACT

A driving method, for driving an organic light emitting diode (OLED) display panel, includes following steps. Input gray levels are received corresponding to red, green and blue subpixels on the OLED display panel. The input gray levels are mapped into current indices. A representative current index is calculated according to the current indices. The representative current index is compared with a current index threshold. In response to the representative current index being lower than the current index threshold, a voltage compensation value is generated according to the representative current index for shifting an initial voltage level utilized in an initial phase of the OLED display panel, and gray level compensation values are generated according to the current indices for adjusting the input gray levels into adjusted gray levels corresponding to the red, green and blue subpixels.

13 Claims, 7 Drawing Sheets

200

DRIVING METHOD FOR DRIVING ORGANIC LIGHT EMITTING DIODE DISPLAY PANEL

BACKGROUND

Field of Invention

The disclosure relates to a driving method. More particularly, the disclosure relates to a driving method for driving an organic light emitting diode display panel.

Description of Related Art

On a modern display device, organic light-emitting diodes (OLED) are widely used in display screens. Unlike traditional LCDs, each pixel in an OLED emits its own light, enabling rich contrast and vibrant colors. This self-emissive property eliminates the need for a backlight, resulting in thinner and lighter displays with faster response times. OLED panels offer wider viewing angles, energy efficiency, and the potential for flexible, curved, and even transparent designs. These OLED panels are utilized in TVs, smartphones, wearables, and more, revolutionizing visual experiences across various devices with their superior image quality and design versatility.

SUMMARY

An embodiment of the disclosure provides a driving method, which is suitable for driving an organic light emitting diode (OLED) display panel. The driving method includes following steps. Input gray levels are received corresponding to red, green and blue subpixels on the OLED display panel. The input gray levels are mapped into current indices. A representative current index is calculated according to the current indices. The representative current index is compared with a current index threshold. In response to the representative current index being lower than the current index threshold, a voltage compensation value is generated according to the representative current index for shifting an initial voltage level utilized in an initial phase of the OLED display panel, and gray level compensation values are generated according to the current indices for adjusting the input gray levels into adjusted gray levels corresponding to the red, green and blue subpixels.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
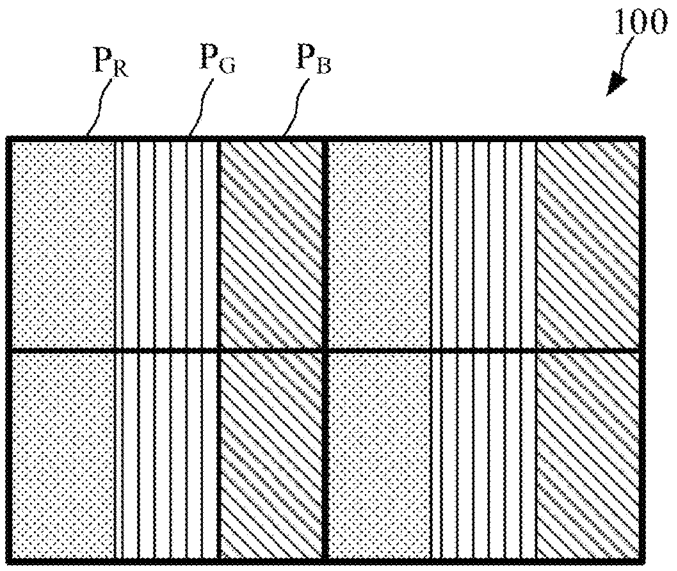
FIG. 1 is a schematic diagram illustrating subpixels on an organic light emitting diode display panel according to some embodiments of this disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
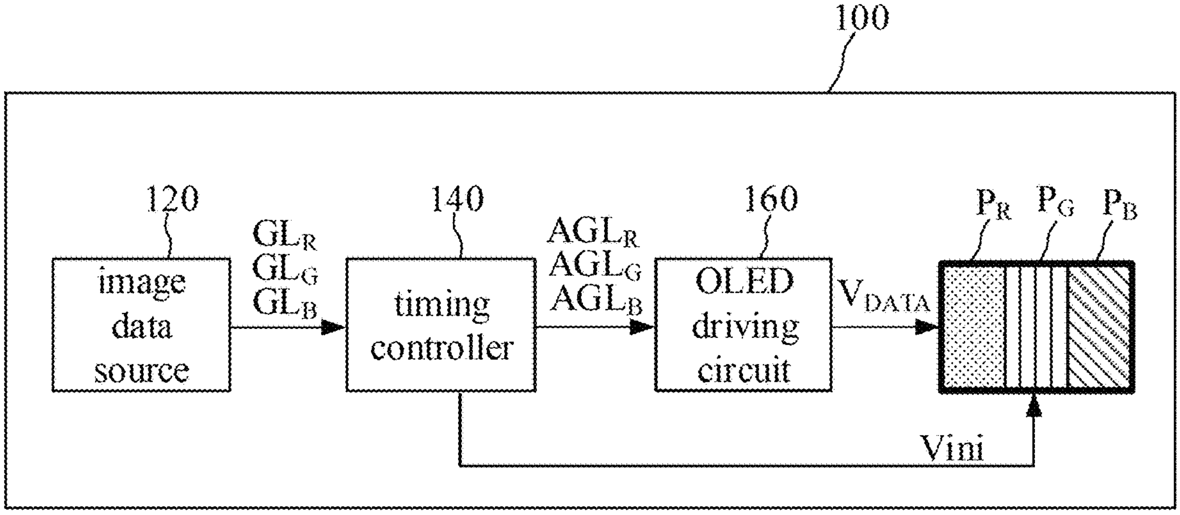
FIG. 2 is a block diagram illustrating internal circuits of the OLED display panel according to some embodiments of this disclosure.

Reference is made to FIG. 1, which is a schematic diagram illustrating subpixels on an organic light emitting diode (OLED) display panel according to some embodiments of this disclosure. As shown in FIG. 1, the OLED display panel 100 includes red subpixels $P_R$, green subpixels $P_G$ and blue subpixels $P_B$. These red/green/blue (RGB) subpixels are arranged as pixels to display different colors. Four pixels of the OLED display panel 100 are illustrated for demonstration in FIG. 1. In practical applications, the OLED display panel 100 is not limited to four pixels. Reference is further made to FIG. 2, which is a block diagram illustrating internal circuits of the OLED display panel 100 according to some embodiments of this disclosure. As shown in FIG. 2, the OLED display panel 100 includes an image data source 120, a controller 140 and a data driver 160. The controller 140 is coupled between the image data source 120 and the data driver 160.

In some embodiments, the image data source 120 provides gray levels GL of image frames to be displayed on the red subpixels $P_R$, green subpixels $P_G$ and blue subpixels $P_B$ of the OLED display panel 100. In some embodiments, the image data source 120 can be an application processor (AP) or a system-on-chip (SoC).

In some cases, these gray levels GL can be converted into data voltages $V_{DATA}$ by a digital-to-analog converter of the data driver 160 for controlling luminance (brightness) of light emitted on the red subpixels $P_R$, green subpixels $P_G$ and blue subpixels $P_B$.

Because of manufacturing variances, the subpixels located on different positions may have different wiring resistances (i.e., different IR drops) while transmitting these data voltages $V_{DATA}$. In some cases, the different IR drops on different subpixels may cause a color shift problem on the OLED display panel 100. In some embodiments, the controller 140 is configured to receive the input gray levels GL from the image data source 120 and adjusts the input gray levels GL into adjusted gray levels AGL, so as to compensate the IR drops and avoid the color shift problem on the OLED display panel 100. In some embodiments, the controller 140 can be implemented by a timing controller (TCON) of the OLED display panel 100.

Figure 3:
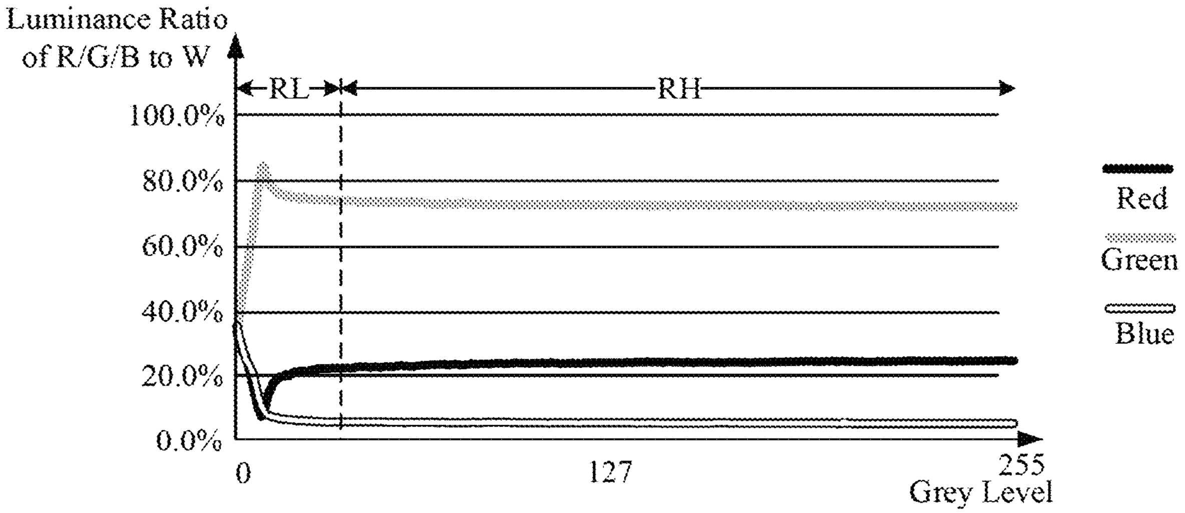
FIG. 3 is a schematic diagram illustrating a relationship between luminance of displaying one of red, green or blue color compared to luminance of displaying a white color along different gray levels.

It is noticed that, the red subpixels $P_R$, green subpixels $P_G$ and blue subpixels $P_B$ may have different efficiencies in light-emitting. Reference is further made to FIG. 3, which is a schematic diagram illustrating a relationship between luminance of displaying one of red, green or blue color compared to luminance of displaying a white color along different gray levels. As shown in FIG. 3, there are three luminance ratio curves $L_{RED}$, $L_{GREEN}$ and $L_{BLUE}$ corresponding to red, green and blue colors.

According to the luminance ratio curve $L_{GREEN}$ of green color, luminance on a pixel displaying the green color (e.g., the green subpixel PG illuminates, and other subpixels are turned off) can reach about 70% of luminance on the pixel displaying the white color (e.g., the red, green and blue subpixels illuminate) in a higher gray level region RH (e.g., brighter), such as between the $30^{th}$ gray level and $255^{th}$ gray level. According to the luminance ratio curve $L_{RED}$ of red color, luminance on a pixel displaying the red color is about 23% of luminance on the pixel displaying the white color in the brighter gray level region RH. According to the luminance ratio curve $L_{BLUE}$ of red color, luminance on a pixel displaying the blue color is about 7% of luminance on the pixel displaying in the brighter gray level region RH.

In the brighter gray level region RH, the green subpixel has the highest efficiency in light-emitting; the red subpixel has the intermediate efficiency in light-emitting; the blue subpixel has the lowest efficiency in light-emitting. As shown in FIG. 3, in the higher gray level region RH, the luminance ratio curves $L_{RED}$, $L_{GREEN}$ and $L_{BLUE}$ show relatively stable efficiency ratios, at about 23:70:7, between each other. In some embodiments, when the gray levels GL are within the brighter gray level region RH, the controller 140 is able to compensate the IR drops and avoid the color shift problem based on this efficiency ratio 23:70:7.

On the other hand, the luminance ratio curves $L_{RED}$, $L_{GREEN}$ and $L_{BLUE}$ shows different relationships in a lower gray level region RL (darker). As shown in FIG. 3, the luminance ratio curves $L_{RED}$, $L_{GREEN}$ and $L_{BLUE}$ show different ratios in the lower gray level region RL, and no longer have the relatively stable efficiency ratios, at about 23:70:7, between each other. For example, around the $10^{th}$ gray level in the lower gray level region RL, the efficiency of the green subpixel boosts, and the efficiency of the red subpixel drops below the efficiency of the blue subpixel. In this case, if the input gray levels GL within the lower gray level region RL are compensated according to the same manner as the input gray levels GL within the higher gray level region RH, it will induce the color shift problem on the OLED display panel 100.

In some embodiments, the controller 140 is configured to compensate the input gray levels GL within the lower gray level region RL in a different manner from the input gray levels GL within the higher gray level region RH.

Figure 4:
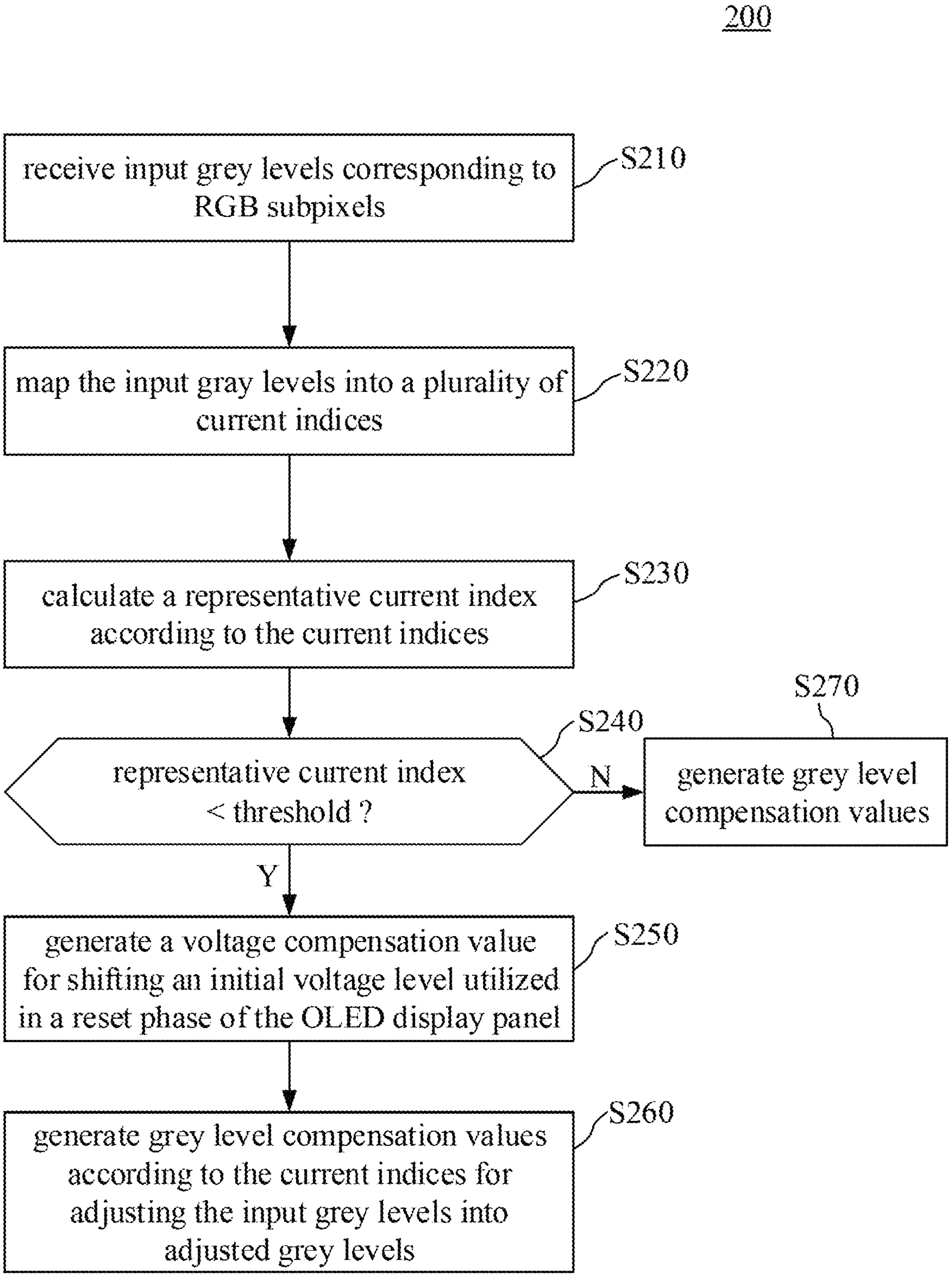
FIG. 4 is a flow chart diagram illustrating a driving method according to some embodiments of the disclosure.

Reference is further made to FIG. 4, which is a flow chart diagram illustrating a driving method 200 according to some embodiments of the disclosure. In some embodiments, the driving method 200 can be executed by the controller 140 as shown in FIG. 2.

As shown in FIG. 2 and FIG. 4, in step S210, the controller 140 receives the input gray levels GL, from the image data source 120, corresponding to the red, green and blue subpixels $P_R$, $P_G$, $P_B$ on the OLED display panel 100.

In step S220, the controller 140 maps the input gray levels GL into current indices. The current indices indicates amplitudes of light-emitting currents flowing through the red, green and blue subpixels $P_R$, $P_G$, $P_B$ corresponding to the input gray levels. Because the red, green and blue subpixels $P_R$, $P_G$, $P_B$ have different efficiencies in light-emitting, it may require different amplitudes of light-emitting currents to emit different colored lights at the same gray levels. In some embodiments, the input gray levels GL can be mapped into the current indices as shown in Table 1:

TABLE 1

| input gray level | current index on $P_R$ | current index on $P_G$ | current index on $P_B$ |
|---|---|---|---|
| 0 | 0 | 0 | 0 |
| . . . | . . . | . . . | . . . |
| 127 | 60 | 55 | 100 |
| . . . | . . . | . . . | . . . |
| 255 | 200 | 150 | 500 |

As shown in FIG. 1, when the input gray level GL to be displayed on the red subpixel $P_R$ equals to 127, the corresponding current index on the red subpixel $P_R$ equals to 60; the input gray level GL to be displayed on the blue subpixel $P_B$ equals to 127, the corresponding current index on the blue subpixel $P_B$ equals to 100. It means that the blue subpixel $P_B$ may require a larger light-emitting current to achieve the $127^{th}$ gray level. In comparison, the red subpixel $P_R$ may utilize a smaller light-emitting current to achieve the $127^{th}$ gray level.

In step S230, the controller 140 calculates a representative current index according to all of the current indices corresponding to all subpixels. In some embodiments, the representative current index can be calculated according to an average of all current indices. In some other embodiments, the representative current index can be calculated by summing up all current indices. The representative current index represents a total light-emitting current for driving the pixels over the whole OLED display panel 100 in a data frame.

In step S240, the controller 140 compares the representative current index with a current index threshold. If the comparison result in step S240 shows that the representative current index is lower than the current index threshold, it means that the OLED display panel 100 is currently display a low brightness frame, and step 250 can be executed by the controller 140 to generate a voltage compensation value according to the representative current index. The voltage compensation value generated in step S250 is configured for shifting an initial voltage level $V_{ini}$ utilized in an initial phase of the OLED display panel.

Figure 5:
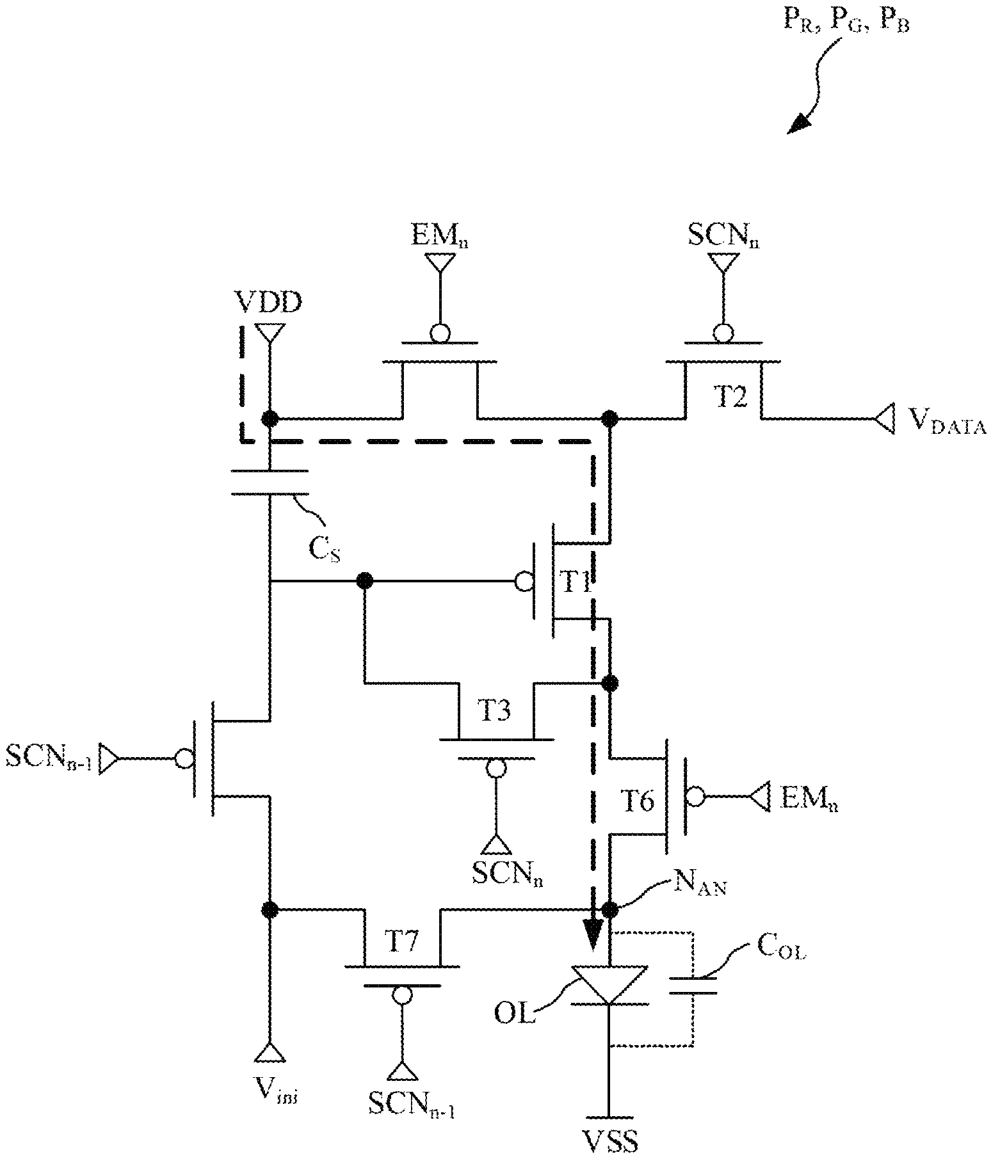
FIG. 5 is a schematic diagram illustrating a structure of one of the red, green and blue subpixels according to some embodiments of the disclosure.
Figure 6:
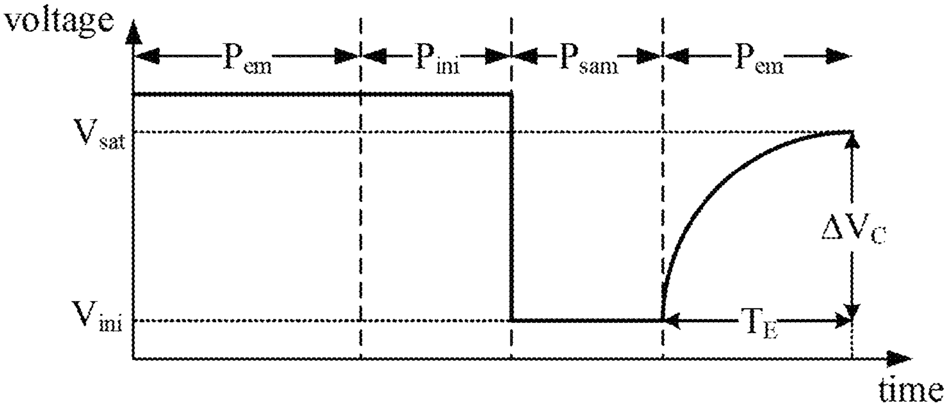
FIG. 6 is a signal waveform diagram illustrating a variation of voltage levels on an anode of the organic light emitting diode shown in FIG. 5 over different phases.

Reference is further made to FIG. 5 and FIG. 6. FIG. 5 is a schematic diagram illustrating a structure of one of the red, green and blue subpixels $P_R$, $P_G$, $P_B$ according to some embodiments of the disclosure. FIG. 6 is a signal waveform diagram illustrating a variation of voltage levels on an anode of the organic light emitting diode OL shown in FIG. 5 over different phases. As shown in FIG. 5, each of the red, green and blue subpixels $P_R$, $P_G$, $P_B$ can be implemented with seven transistors T1-T7 and one capacitor Cs (7T1C) for driving the organic light emitting diode OL. The organic light emitting diode OL has a parasitic capacitor $C_{OL}$. As shown in FIG. 5 and FIG. 6, in an initial phase $P_{ini}$ before an light-emitting phase $P_{em}$, the transistors T4 and T7 are conducted by a scan signal $SCN_{n-1}$, and the initial voltage level $V_{ini}$ will pass through the transistors T4 and T7 to reset a level on a gate terminal of the transistor T1 and also reset a level on an anode $N_{AN}$ of the organic light emitting diode OL. As shown in FIG. 5 and FIG. 6, in a sampling phase $P_{sam}$ after the initial phase $P_{ini}$, a data voltage $V_{DATA}$ will pass through the transistors T2, T1 and T3 to set the level on a gate terminal of the transistor T1, e.g., to be equal to $V_{DATA}-V_{TH}$.

It is noticed that the subpixel structure shown in FIG. 5 illustrate one demonstrational example of the red, green and blue subpixels $P_R$, $P_G$, $P_B$, but the disclosure is not limited to this subpixel structure. In some other embodiments, other equivalent subpixel structure with controllable initial voltage level $V_{ini}$ can be utilized in this disclosure.

As shown in FIG. 5 and FIG. 6, in a light-emitting phase $P_{em}$ after the sampling phase $P_{sam}$, the level on an anode $N_{AN}$ of the organic light emitting diode OL will be charged by the light-emitting currents IL from the initial voltage level $V_{ini}$ toward a saturation voltage level Vsat of the organic light emitting diode OL.

After the initial phase $P_{ini}$, the anode $N_{AN}$ is maintained at the initial voltage level $V_{ini}$ until the emission. In order to ensure stable light-emitting from the organic light emitting diode OL, it is necessary to charge the anode $N_{AN}$ of the organic light emitting diode OL from the initial voltage level $V_{ini}$ to the saturation voltage level $V_{sat}$, so as to drive the organic light emitting diode OL into a saturation state. In other words, as shown in FIG. 6, the charging voltage difference $\Delta V_C$ is desired to be:

$$\Delta V_C = V_{sat} - V_{ini}.$$

Because the anode $N_{AN}$ is charged by the light-emitting currents IL to reach the charging voltage difference $\Delta V_C$, actual charging voltage difference $\Delta V_C$ can be represented by:

$$\Delta V_C = \frac{IL \times TE}{C_{OL}} - V_{ini}.$$

In aforesaid formula, the actual charging voltage difference $\Delta V_C$ is correlated with the light-emitting currents IL, a time length TE of the light-emitting phase $P_{em}$, and the parasitic capacitor $C_{OL}$ of the organic light emitting diode OL.

When the input gray levels GL are in the lower gray level region RL, the light-emitting currents IL will be relatively small. It will be harder to charge the anode $N_{AN}$ to reach the charging voltage difference $\Delta V_C$ with a small light-emitting currents IL. In some embodiments, in step S250, the controller 140 generates a voltage compensation value according to the representative current index for shifting the initial voltage level $V_{ini}$. In this case, the voltage compensation value is utilized to boost the initial voltage level $V_{ini}$. In some embodiments, the voltage compensation value is generated in negatively correlated to the representative current index, as shown in Table 2:

TABLE 2

| representative current index | voltage compensation value | shifted initial voltage level $V_{ini}$ |
|---|---|---|
| 0 | 3.3 | 0 V |
| 20 | 2.8 | −0.5 V |
| 40 | 2.3 | −1 V |
| . . . | . . . | . . . |
| 100 | 0 | −3.3 V |

As examples shown in Table 2, the voltage compensation value generated by the controller 140 is added on an original initial voltage level (e.g., −3.3V for example) to shift/boost the initial voltage level $V_{ini}$. In this case, because the initial voltage level $V_{ini}$ is shifted to an increased level, it will be easier/faster to charge anode $N_{AN}$ to the desired charging voltage difference $\Delta V_C$ and it can ensure the organic light emitting diode OL to emit in the saturation state.

In some other embodiments, in step S250, the voltage compensation value are generated according to the representative current index and further according to a frame rate of refreshing the OLED display panel, as shown in

TABLE 3

| representative current index value (frame rate: 15 Hz) | voltage compensation value (frame rate: 60 Hz) | voltage compensation value (frame rate: 120 Hz) | |
|---|---|---|---|
| 0 | 3.0 | 3.1 | 3.3 |
| 20 | 2.5 | 2.6 | 2.8 |
| 40 | 2.0 | 2.1 | 2.3 |
| . . . | . . . | . . . | . . . |
| 100 | 0 | 0 | 0 |

It is noticed that, when the frame rate is higher, the time length TE of the light-emitting phase $P_{em}$ will be shorter, such that it will be more difficult to reach the desired charging voltage difference $\Delta V_C$. In this case, the controller 140 generates the voltage compensation value in positively correlated to the frame rate. When the frame rate is higher, the initial voltage level $V_{ini}$ will be shifted to a higher level to compensate the shorter time length TE of the light-emitting phase $P_{em}$.

In some embodiments, in step S260, the controller 140 generates gray level compensation values according to the current indices for adjusting the input gray levels GL into adjusted gray levels AGL corresponding to the red, green and blue subpixels $P_R$, $P_G$, $P_B$. In some embodiments, the gray level compensation values are generated in step S260 separately for red, green and blue sub-pixels $P_R$, $P_G$, $P_B$. The gray level compensation values for the red subpixels $P_R$ are not suitable to be used on the green subpixels $P_G$ or the blue subpixels $P_B$. Therefore, the gray levels for different colors can be generated based on different compensation values. The adjusted gray levels AGL are transmitted from the controller 140 to a data driver 160. According to the adjusted gray levels AGL, the data driver 160 is configured to provide data voltages $V_{DATA}$ to the red, green and blue subpixels $P_R$, $P_G$, $P_B$. For example, the gray level compensation values for the red subpixels $P_R$ can be generated according to Table 4:

TABLE 4

| current index | gray level compensation value for $P_R$ |
|---|---|
| 0 | 3 |
| 20 | 1 |
| 40 | 0 |
| . . . | . . . |
| 100 | −5 |

For example, the gray level compensation values for the green subpixels $P_G$ can be generated according to Table 5:

TABLE 5

| current index | gray level compensation value for $P_G$ |
|---|---|
| 0 | 1 |
| 20 | 0 |
| 40 | −1 |
| . . . | . . . |
| 100 | −8 |

In some other embodiments, in step S260, the gray level compensation values are generated according to the current indices and further according to a frame rate of refreshing the OLED display panel. For example, the gray level compensation values for the red subpixels $P_R$ can be generated according to Table 6:

TABLE 6

| current index | gray level compensation value for $P_R$ (frame rate: 15 Hz) | gray level compensation value for $P_R$ (frame rate: 60 Hz) | gray level compensation value for $P_R$ (frame rate: 120 Hz) |
|---|---|---|---|
| 0 | 1 | 3 | 5 |
| 20 | 0 | 2 | 4 |
| 40 | −1 | 1 | 3 |
| . . . | . . . | . . . | . . . |
| 100 | −5 | −3 | −1 |

It is noticed that, when the frame rate is higher, the time length TE of the light-emitting phase $P_{em}$ will be shorter, such that it will be more difficult to reach the desired charging voltage difference $\Delta V_C$. In this case, the controller 140 generates the gray level compensation value in positively correlated to the frame rate. When the frame rate is higher, the gray level compensation value will be larger to compensate the shorter time length TE of the light-emitting phase $P_{em}$.

If the comparison result shows that the representative current index exceeds or equal to the current index threshold, it means that the OLED display panel 100 is currently display a high brightness frame, and the step S270 can be executed by the controller 140, to generate the gray level compensation values for adjusting the input gray levels GL into adjusted gray levels AGL, without shifting the initial voltage level $V_{ini}$. For example, the gray level compensation values can be generated based on the relatively stable efficiency ratios, at about 23:70:7, between the red, green and blue subpixels $P_R$, $P_G$, $P_B$.

Figure 7:
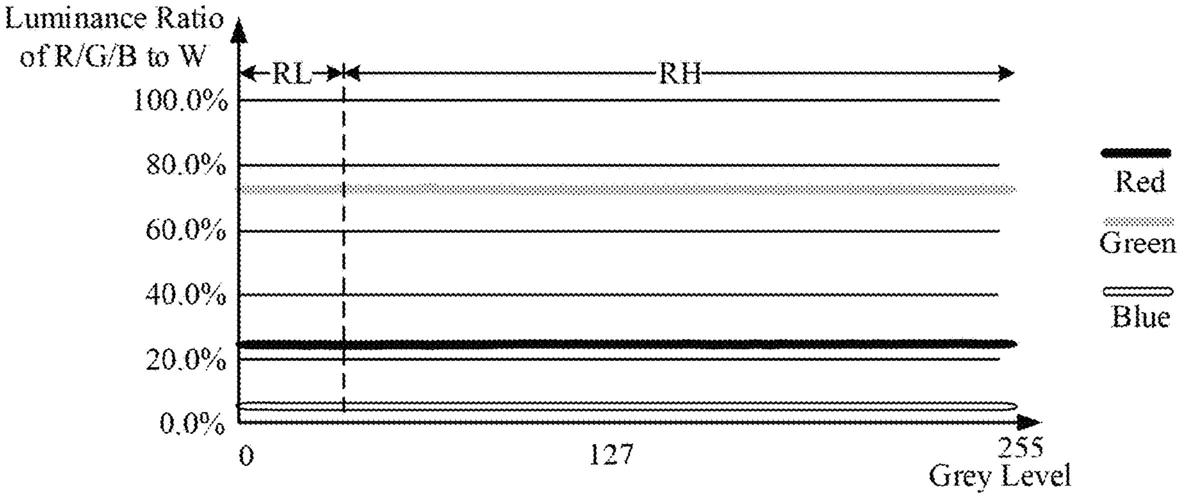
FIG. 7 is a schematic diagram illustrating a relationship between luminance of displaying one of red, green or blue color along different gray levels after compensation.

Based on aforesaid embodiments, when the input gray levels GL within the lower gray level region RL, the controller 140 will shift the initial voltage level and adjusts the gray levels for compensation. Reference is further made to FIG. 7, which is a schematic diagram illustrating a relationship between luminance of displaying one of red, green or blue color along different gray levels after compensation. As shown in FIG. 7, in both of the higher gray level region RH and the lower gray level region RL, the luminance ratio curves $L_{RED}$, $L_{GREEN}$ and $L_{BLUE}$ show relatively stable efficiency ratios. In this case, for input gray levels on different regions, the red, green or blue subpixels $P_R$, $P_G$, $P_B$ can be driven to emit color light in stable efficiency ratios, such that the color shift problem in the lower gray level region RL can be prevented.

Figure 8:
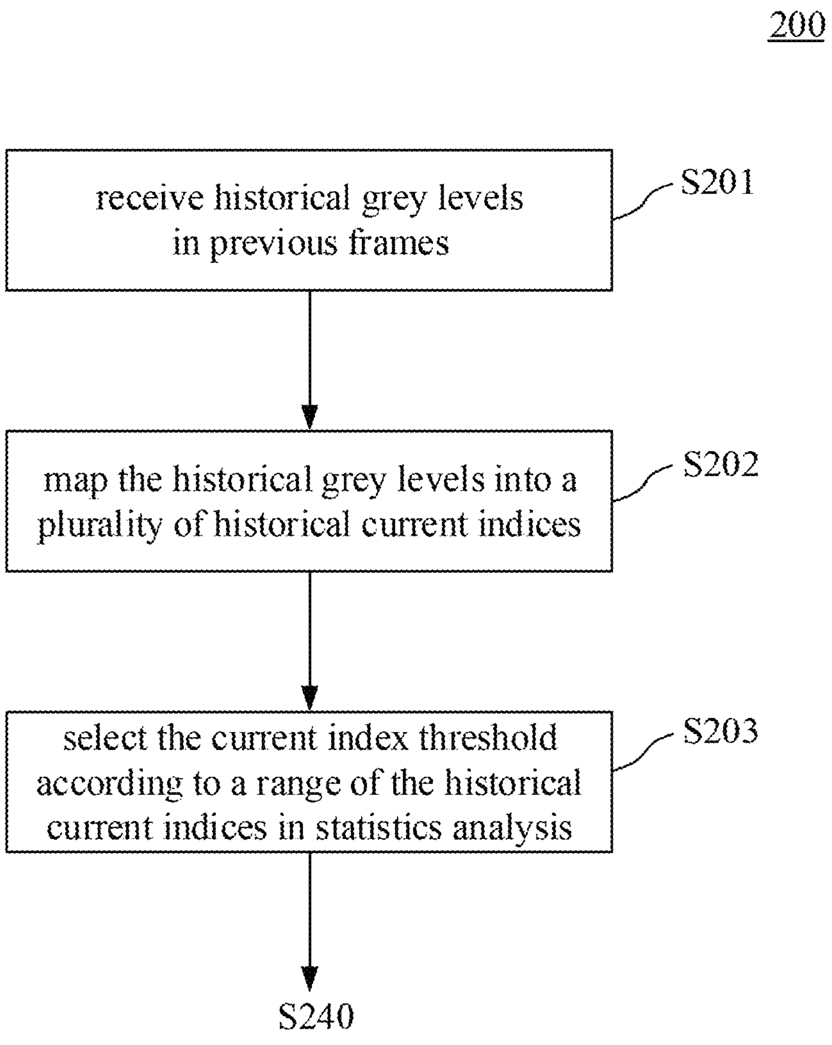
FIG. 8 is a flow chart diagram illustrating further steps about how to determine the current index threshold in the driving method shown in FIG. 4.

In some embodiments, the current index threshold mentioned in step S240 in FIG. 4 can be determined according to historical image data in previous frames. Reference is further made to FIG. 8, which is a flow chart diagram illustrating further steps about how to determine the current index threshold in the driving method 200.

As shown in FIG. 8, the driving method 200 may further include steps S201, S202 and S203. In step S201, the controller 140 receives historical gray levels in previous frames. The historical gray levels reflect the brightness illuminated in the previous frames. In step S202, the controller 140 maps the historical gray levels into historical current indices. The historical current indices reflect light-emitting currents for emitting desired luminance in previous frames. In step S203, the controller 140 selects the current index threshold according to a range of the historical current indices in statistics analysis. For example, the historical current indices are in a range between 0 and 1000, and the controller 140 can set the current index threshold at 200, which is 20% of the range (0 to 1000). For example, the historical current indices are in a range between 50 and 500, and the controller 140 can set the current index threshold at 140, which is 20% of the range (50 to 500). The disclosure is not limited to set the current index threshold at 20% of the range. In other cases, the current index threshold at 10%, 15%, 30% or 50% of the range. In other embodiments, the current index threshold can be determined in other equivalent manners.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving method, suitable for driving an organic light emitting diode (OLED) display panel, the driving method comprising:

receiving input gray levels corresponding to red, green and blue subpixels on the OLED display panel;

mapping the input gray levels into current indices;

calculating a representative current index according to the current indices;

comparing the representative current index with a current index threshold; and in response to the representative current index being lower than the current index threshold, generating a voltage compensation value according to the representative current index for shifting an initial voltage level utilized in an initial phase of the OLED display panel, and generating gray level compensation values according to the current indices for adjusting the input gray levels into adjusted gray levels corresponding to the red, green and blue subpixels.

2. The driving method of claim 1, comprising:

in response to the representative current index being higher than the current index threshold, generating the gray level compensation values for adjusting the input gray levels without shifting the initial voltage level.

3. The driving method of claim 1, wherein, in response to the representative current index being lower than the current index threshold, the gray level compensation values are generated according to the current indices and further according to a frame rate of refreshing the OLED display panel.

4. The driving method of claim 3, wherein, in response to the representative current index being lower than the current index threshold, the gray level compensation values are generated in positively correlated to the frame rate.

5. The driving method of claim 1, wherein the voltage compensation value is generated in negatively correlated to the representative current index.

6. The driving method of claim 1, wherein, in response to the representative current index being lower than the current index threshold, the voltage compensation value are generated according to the representative current index and further according to a frame rate of refreshing the OLED display panel.

7. The driving method of claim 6, wherein the voltage compensation value is generated in positively correlated to the frame rate.

8. The driving method of claim 1, wherein the driving method is executed by a timing controller, the timing controller receives the input gray levels corresponding to the red, green and blue subpixels from an application processor (AP) or a system-on-chip (SoC).

9. The driving method of claim 1, wherein the adjusted gray levels are transmitted to a data driver for providing data voltages to the red, green and blue subpixels.

10. The driving method of claim 1, wherein the current indices indicate amplitudes of light-emitting currents flowing through the red, green and blue subpixels corresponding to the input gray levels.

11. The driving method of claim 1, wherein the current index threshold is determined by:

receiving historical gray levels in previous frames;

mapping the historical gray levels into historical current indices; and selecting the current index threshold according to a range of the historical current indices in statistics analysis.

12. The driving method of claim 1, wherein the initial voltage level is utilized to reset anode voltages on organic light emitting diodes before a light-emitting phase.

13. The driving method of claim 1, wherein the initial voltage level is utilized to reset gate voltages on driving transistors in OLED driving circuits during the initial phase.

* * * * *